United States Patent [19]

Ikawa et al.

[11] Patent Number: 5,921,527
[45] Date of Patent: Jul. 13, 1999

[54] ROTARY-TYPE DOOR APPARATUS HAVING TWO ENGAGEMENT PORTIONS FOR MANUAL OR AUTOMATIC DRIVING

[75] Inventors: Katsumi Ikawa; Tatsuya Noguchi, both of Kariya, Japan

[73] Assignee: Denso Corporation, Kariya, Japan

[21] Appl. No.: 08/769,889

[22] Filed: Dec. 19, 1996

[30] Foreign Application Priority Data

Dec. 22, 1995 [JP] Japan .................................... 7-335428

[51] Int. Cl.$^6$ ............................................. B60H 1/32
[52] U.S. Cl. ................... 251/129.03; 251/292; 454/69; 454/121
[58] Field of Search ................. 454/121, 69, 126, 454/139, 156, 159, 160, 161; 137/625.47; 251/292, 129.03; 16/DIG. 41

[56] References Cited

U.S. PATENT DOCUMENTS

| 801,012 | 10/1905 | Howard | 251/129.03 X |
|---|---|---|---|
| 3,687,415 | 8/1972 | Turkot | 251/129.03 X |
| 4,647,007 | 3/1987 | Bajka | 251/129.03 |
| 4,889,315 | 12/1989 | Imanaga | 251/129.03 |
| 5,564,979 | 10/1996 | Sumiya et al. | 454/121 |

FOREIGN PATENT DOCUMENTS

| 232082 | 10/1909 | Germany | 251/129.03 |
|---|---|---|---|
| 1-59718 | 4/1989 | Japan . | |
| 7-017234 | 1/1995 | Japan . | |

*Primary Examiner*—Harold Joyce
*Attorney, Agent, or Firm*—Harness, Dickey & Pierce, PLC

[57] ABSTRACT

In an air conditioner unit having a rotary-type door for changing air flow direction, a free end part of a rotary-type door support shaft is formed in a tubular shape. The free end part have an outside flat face on a part of the radially outside periphery and an inside flat face on a part of the radially inside periphery. A lever having an opening which corresponds to the outside peripheral shape of the free end part is fitted on the free end part in the case of manually driving the switching door. A rotary output shaft of an actuator having an outside flat face which corresponds to the inside peripheral shape of the free end part is fitted into the free end part in the case of automatically driving the switching door. The flat faces determine a fixing position of the lever or the actuator in a circumferential direction.

16 Claims, 4 Drawing Sheets

ROTARY-TYPE DOOR APPARATUS HAVING TWO ENGAGEMENT PORTIONS FOR MANUAL OR AUTOMATIC DRIVING

BACKGROUND OF THE INVENTION

1. Field of the Invention

The present invention relates to a rotary-type door apparatus and, more particularly, to a fitting structure of a rotary-type door for engagement with a driving member driven manually or automatically as the case may be.

2. Description of Related Art

An automotive air-conditioner unit has a rotary-type mode switching door apparatus which changes direction of air flow supplied into a vehicle compartment. In the air conditioner unit, as shown in FIG. 9, a heater core 5 is disposed horizontally at a lower part within an air conditioning duct D. A rotary-type air mixing door 6 is disposed right above the heater core 5 and turns around a support shaft 61. The mixing door 6 determines a ratio of branching air, which is supplied from a blower 7 through an air passage 71 to be air-conditioned, to the heater core 5.

The branched air joins again to non-branched air at the downstream of the heater core 5 and flows as air-conditioned air upward to a rotary-type mode switching door 1 through an air passage 72. The switching door 1 is constructed as a semi-cylindrical body having an opening on a part of a circumferential periphery thereof. The switching door 1 is fixed to a support shaft 11 at its axial center to rotate around the central axis. The air passage 72 branches off to a for-defroster passage 73, a for-face or vehicle upper compartment passage 74 and a for-foot or vehicle lower compartment passage 75 through the switching door 1.

As the switching door 1 turns, the air-conditioned air blow-off mode is changed sequentially to a defrosting mode (DEF), defrosting-foot mode (D/F), foot mode (FOOT) and bi-level mode (B/L), in which the air passage 72 communicates with the defroster passage 73, with both the defroster passage 73 and the for-foot passage 75, with the for-foot passage 75, and with both the for-face passage 74 and for-foot passage 75, respectively.

The switching door 1 is driven by a driving lever 81 fixed to the support shaft 11. In the case of manually driving the switching door 1, the driving lever 81 is connected to one end of a wire (not shown) the other end of which is connected to a manually-operable blow-off mode switching lever provided in a vehicle compartment. In the case of automatically driving the switching door 1, the driving lever 81 is connected to one end of a link rod 82 the other end of which is connected to another driving lever 83 fixed to the output shaft 41 of a rotary-type actuator 4 such as an electric motor.

According to this arrangement, although both the switching door 1 and the actuator 4 are rotary-type, the link rod 82 and the driving lever 83 of the actuator 4 are used to drive the switching door 1 by the actuator 4. This necessitates not only an additional mounting space for the driving mechanism but also position-adjusting work for the driving levers 81, 83 and the link rod 82 so that operations of the switching door 1 and the actuator 4 may be synchronized.

SUMMARY OF THE INVENTION

It is therefore an object of the present invention to provide a rotary-type door apparatus which can be driven either manually or automatically without requiring a complicated driving mechanism.

It is a further object of the present invention to provide a rotary-type door apparatus which requires less mounting space for a driving mechanism and less adjustment work.

According to the present invention, a support shaft for a rotary-type door is formed, at a free end part thereof, with both a first engagement portion to be used for one of manual driving and a second engagement portion to be used for the other of automatic driving.

Preferably, a driving lever is fitted to the first engagement portion to be driven manually when the manual driving is selected, while an output shaft of an actuator is directly fitted to the second engagement portion to drive the support shaft automatically.

Preferably, the free end of the support shaft is formed in a tubular shape, and the tubular shape is partly flattened at a radially outside and a radially inside peripheral faces so that the driving lever and the actuator output shaft are fitted with the outside and the inside flat surfaces, respectively. The flat faces determine the fitting positions of the driving lever and the actuator output shaft with the support shaft, respectively.

More preferably, the outside and the inside flat faces are formed in parallel to each other.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF PRESENTLY PREFERRED EMBODIMENT

Figure 1:
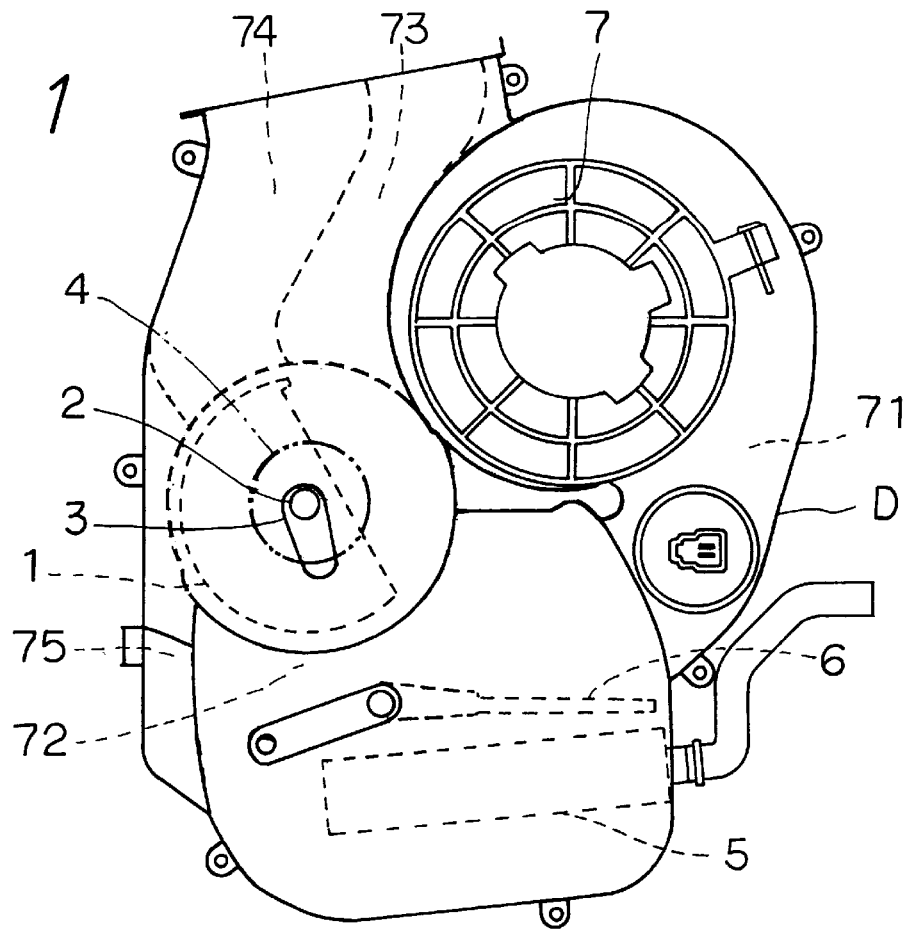
FIG. 1 is a side view of an air-conditioner duct unit using a rotary-type switching door apparatus according to an embodiment of the present invention.
Figure 2:
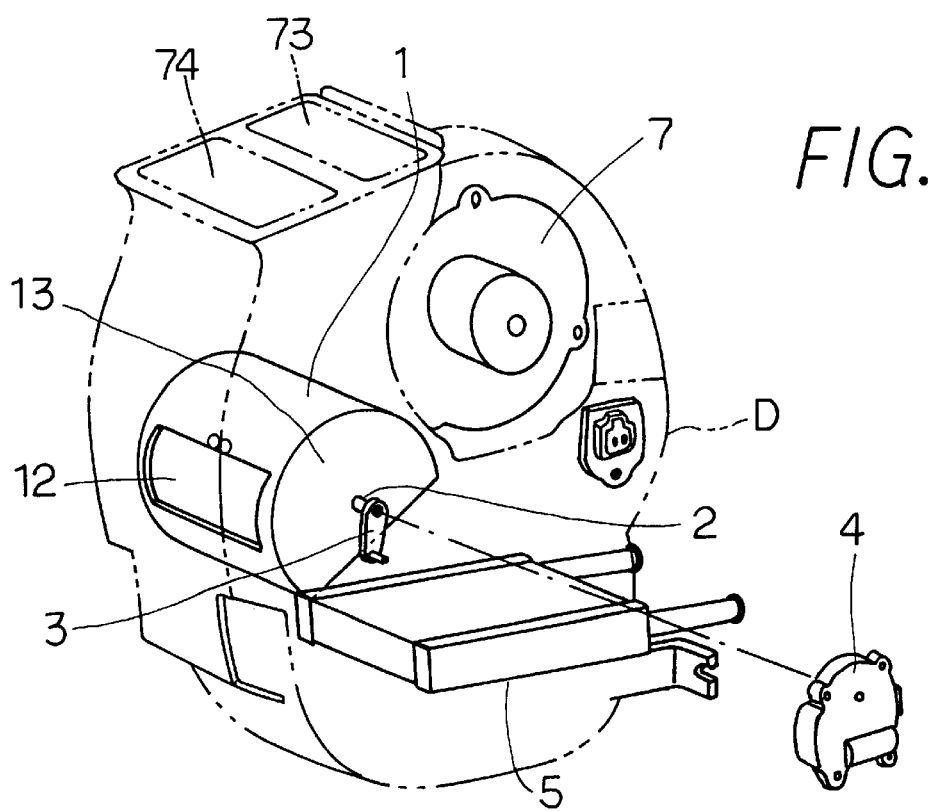
FIG. 2 is a schematic perspective view of the aircondi-tioner duct unit shown in FIG. 1.

An air-conditioner duct unit using a rotary-type door apparatus according to an embodiment of the present invention is shown in FIGS. 1 and 2 and generally similar in configuration to the conventional one except for a rotary-type door driving mechanism. Therefore, air which is blown off by a blower fan 7 into an air passage 71 is branched off by a rotary-type air-mixing door 6 into a heater core 5 and thereafter joins in the non-branched air in an air passage 72 to flow toward a switching door 1. A rotary-type mode switching door 1 branches off, depending on its rotary position, the air-conditioned air in the air passage 72 into a defrosting passage 73, for-face passage 74 directed toward a vehicle upper compartment, and a for-foot passage 75 directed toward a vehicle lower compartment. The air-mixing door 6 and the switching door 7, which are both rotary-type are driven as the case may be either manually or automatically through the same driving mechanism. Therefore, the driving mechanism for the switching door 1 as the rotary-type door is described in further detail hereinbelow.

Figure 5:
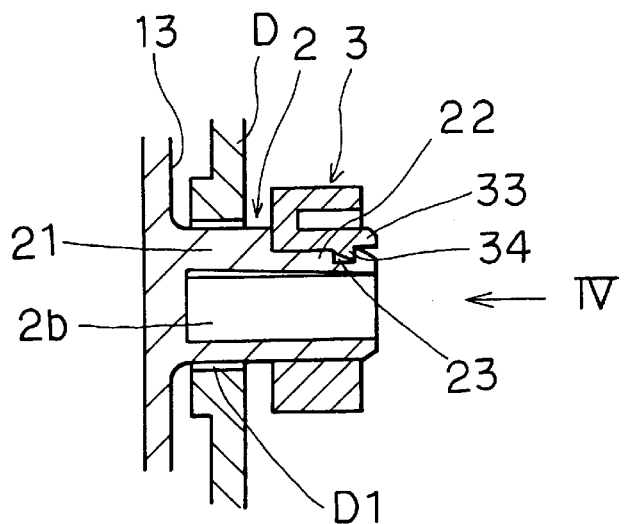
FIG. 5 is a cross-sectional view illustrating the driving lever fitted on the support shaft of the switching door apparatus, the cross section being taken along a line V—V in FIG. 4.

The switching door 1 is positioned above the heater core 5 in the air-conditioner duct D and formed generally in a semi-cylindrical shape having an opening 12 formed on a part of a cylindrical surface. A support shaft 2 is fixed to arc centers of both axial ends 13 of the switching door 1. As shown in FIG. 5, the support shaft 2 is inserted into holes D1 of the side walls of duct unit D so that it may be supported rotatably by the duct side walls. The free end of the support shaft 2 extending axially from the duct side wall is constructed to be fitted with either a driving lever 3 for a manual driving or an electric actuator 4 such as a computer-controlled servo motor for an automatic control.

Figure 3:
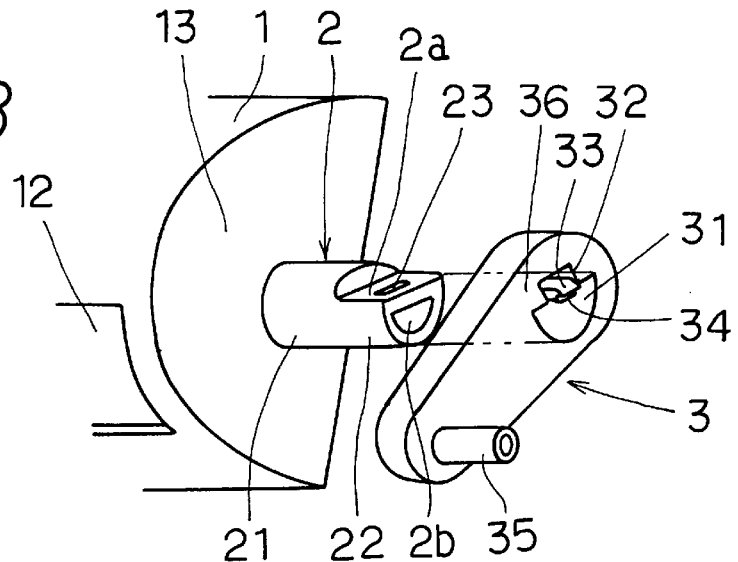
FIG. 3 is an enlarged perspective view illustrating a fitting relation between an axial end part of the switching door apparatus and a driving lever.
Figure 4:
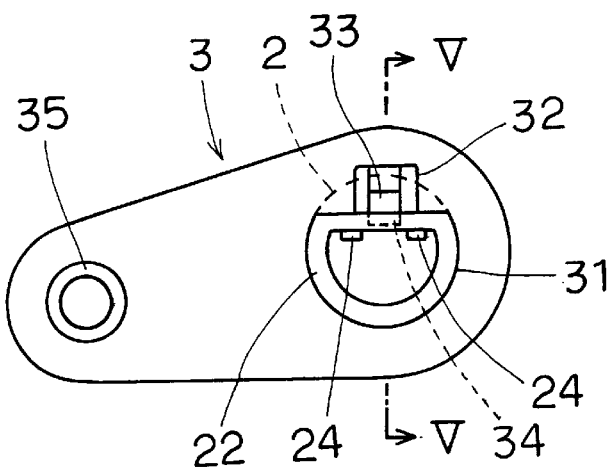
FIG. 4 is a side view illustrating the driving lever fitted on a support shaft of the switching door apparatus, the side view being taken in a direction IV—IV in FIG. 5.

As shown in FIGS. 3 through 5, the support shaft 2 has a tubular-shaped base part 21 and a partly-flattened free end part 22. In the flat face 2a formed radially outside the tubular shape a recess 23 is formed. The driving lever 3 is in an elongated elliptic shape having different-diameter arcs at both free ends thereof. The driving lever 3 has a base 36 in which an opening 31 is formed to be fitted on the free end part 22. The opening 31 has a semi-circular shape which is the same as the free end part 22. Further the driving lever 3 has an opening 32 formed in a rectangular shape and has integrally a thin engagement member 33 protruding resiliently in the rectangular opening 32. The engagement member 33 has a projection 34 which projects into the opening 31 for engagement with the recess 23 in the flat face 2a. The driving lever 3 has a pin 35 at one end thereof so that a wire (not shown) is fixed to the pin 35 to drive the lever 3 manually from inside a vehicle compartment.

The driving lever 3 is inserted directly onto the free end part 22 of the support shaft 2 by aligning the flat face of the opening 31 with the radially outside flat face 2a. During the insertion, the projection 34 normally projecting into the semi-circular opening 31 is raised into the rectangular opening 32 by the free end part 22 and slides over the outside flat face 2a until received in the recess 23 because of its resiliency. With the projection 34 being received in the recess 23, the driving lever 3 is fixedly fitted with the support shaft 2, thus enabling manual driving of the switching door 1.

As described above, circumferential positioning of the driving lever 3 relative to the switch door 1 is attained by just inserting the driving lever 3 onto the free end part 22 of the support shaft 2 while aligning the flat face of the opening 31 with the outside flat face 2a of the free end part 22. Axial positioning of the driving lever 3 relative to the switch door 1 is attained by just inserting the driving lever onto the free end part 22 until the projection 34 of the resilient member 33 is received in the recess 23. The engagement of the projection 34 with the recess 23 assures fixed fitting of the driving lever 3 with the support shaft 2 while preventing detachment of the driving lever 3 from the support shaft 2. Thus, position-adjusting work is simplified without requiring troublesome adjusting work.

Figure 6:
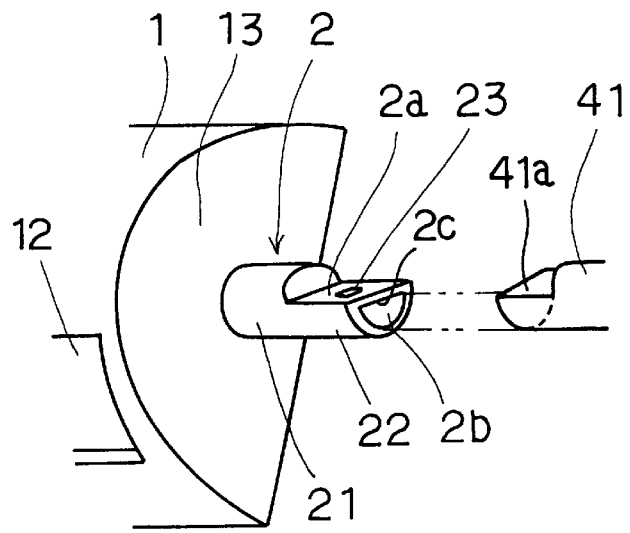
FIG. 6 is an enlarged perspective view illustrating a fitting relation between the axial end part of the switching door apparatus and an actuator output shaft.
Figure 7:
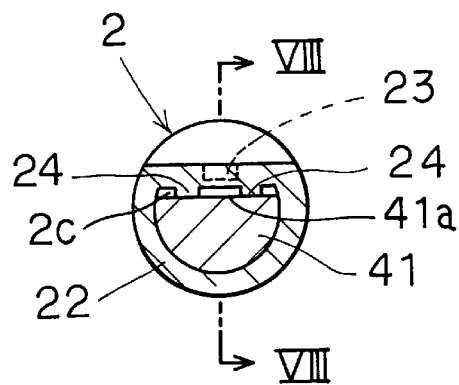
FIG. 7 is a cross-sectional view illustrating the actuator output shaft fitted in the support shaft of the switching door apparatus, the sectional view being taken along a line VII—VII in FIG. 8.
Figure 8:
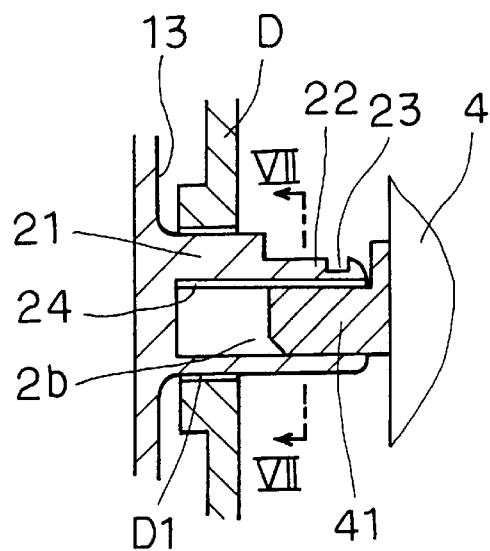
FIG. 8 is another cross-sectional view illustrating the actuator output shaft fitted in the support shaft of the switching door apparatus, the cross section being taken along a line VIII—VIII in FIG. 7.
Figure 9:
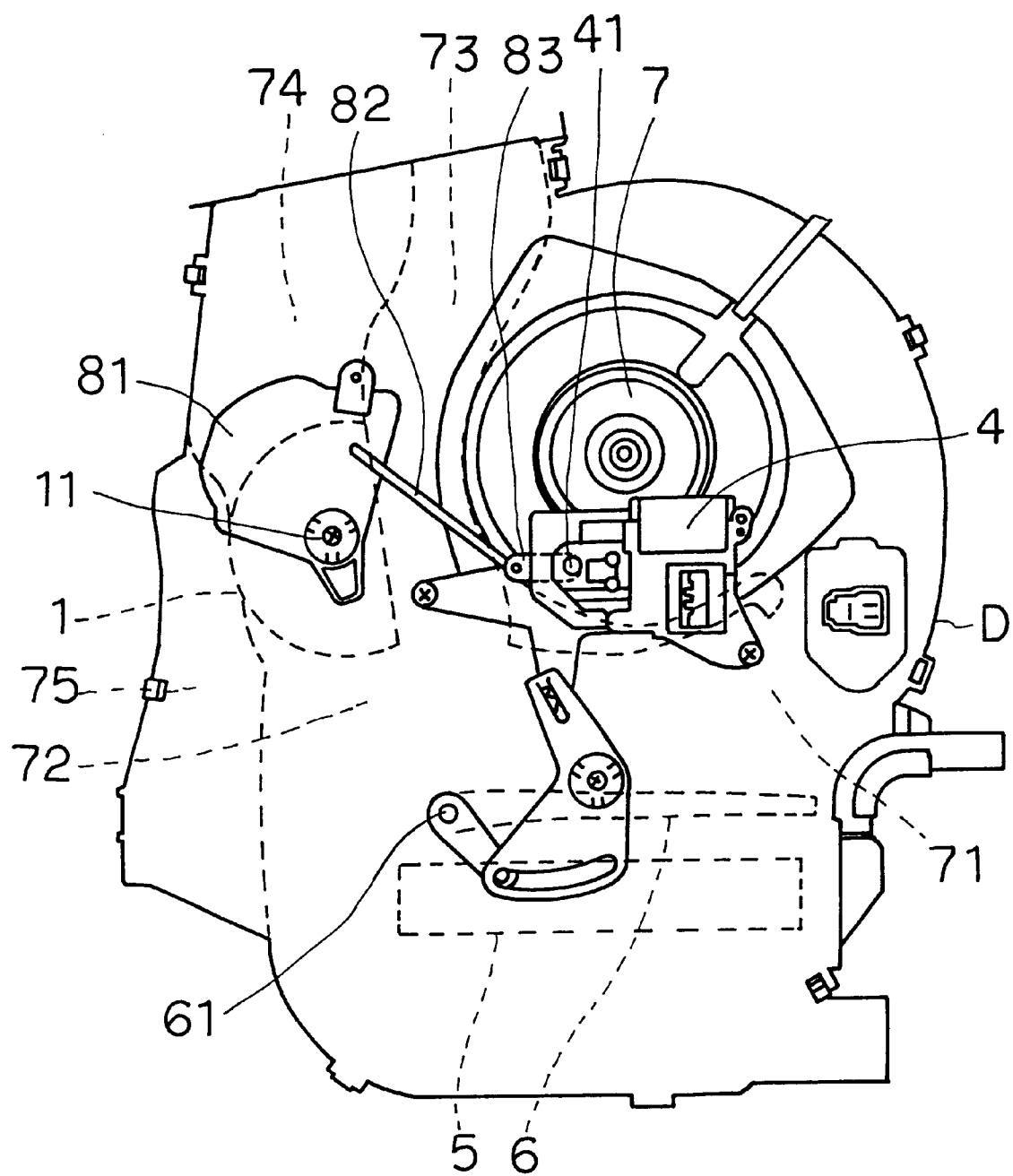
FIG. 9 is a side view of an air-conditioner duct unit using a conventional switching door apparatus.

For the case of driving the switching door automatically, i.e., by way of the computer-controlled actuator 4, the support shaft 2 and an actuator rotary output shaft 41 are coupled as shown in FIGS. 6 through 8. The free end part 22 in the tubular shape has an inside opening 2b which is semi-circular in cross section and has a flat face 2c extending in parallel with the flat face 2a at a position radially inside the flat face 2a. Further, as shown in FIGS. 7 and 8, two ribs 24 are formed on the flat face 2c to extend into the opening 2b. The actuator output shaft 41 has a free end part which is shaped in the similar configuration as the opening 2b. That is, the free end part of the output shaft 41 is formed in a semi-circular shape and has a flat face 41a. The free end part of the output shaft 41 is inserted directly into the opening 2b with its flat face 41a being in contact with the ribs 24.

By positioning the two flat faces 2c and 41a in parallel at the time of inserting the output shaft 41, the circumferential positioning of the output shaft 41 relative to the support shaft 2 and the switching door 1 is attained without troublesome position adjusting work. As shown in FIG. 8, the ribs 24 extend axially in the opening 2b and are tapered so that the ribs 24 becomes higher in the opening 2b as it extends axially deeper toward the axial side face 13 of the switching door 1. Therefore, as the output shaft 41 is inserted into the opening 2b to a certain length, the ribs 24 press-fit the flat face 41a, thus fixedly fitting the actuator output shaft 4 in the support shaft 2.

In the above-described embodiment, the driving lever 3 and the actuator output shaft 41 may be modified to be fitted in the opening 2b and on the flat face 2a, respectively, and the ribs 24 may be formed on the actuator output shaft 41 in place of on the inside flat face 2c. Other modifications and alterations are also possible to the embodiment without departing from the spirit and the scope of the present invention.

What is claimed is:

1. A rotary-type door apparatus for an automotive air conditioner unit, the apparatus comprising:

a rotary-type door rotatably mounted in the air conditioner unit; and a support shaft fixed to the rotary-type door and having an axial end part formed with a first engagement portion for use in one of a manual driving and an automatic driving of the rotary-type door and a second engagement portion for use in an other of the manual driving and the automatic driving of the rotary-type door, the first engagement portion and the second engagement portion being formed on the axial end part, said second engagement portion being smaller than said first engagement portion.

2. A rotary-type door apparatus according to claim 1, wherein:

the axial end part is formed in a generally tubular shape having an outer surface and an inner surface;

the first engagement portion is formed on the outer surface; and the second engagement portion is formed on the inner surface.

3. A rotary-type door apparatus according to claim 2, wherein:

the outer surface of the axial end part is formed with a flat face.

4. A rotary-type door apparatus according to claim 2, wherein:

the inside surface of the axial end part is formed with a flat face.

5. A rotary-type door apparatus according to claim 3, wherein:
the inside surface of the axial end part is formed with a flat face in parallel with the flat face on the outer surface of the axial end part.

6. A rotary-type door apparatus according to claim 3, further comprising:
a manually-driven lever formed with an opening which corresponds to a radially outside peripheral shape of the outer surface of the axial end part and fixedly fitted on the end part so that the flat face on the outer surface of the axial end part determines a fitting position of the lever in a circumferential direction.

7. A rotary-type door apparatus according to claim 4, further comprising:
an electrically-driven actuator having a rotary output shaft formed to have a radially outside peripheral shape which corresponds to a radially inside shape of the inner surface of the axial end part, the rotary output shaft being fixedly fitted axially into the axial end part so that the flat face on the inner surface of the axial end part determines a fitting position of the rotary output shaft in a circumferential direction.

8. A rotary-type door apparatus according to claim 6, wherein:
the axial end part if formed with a recess on the flat face on the outside surface; and
the lever has an engagement member for engagement with the recess thereby to prevent the lever from disengaging from the support shaft in an axial direction of the support shaft.

9. A rotary-type door apparatus according to claim 7, wherein:
the rotary output shaft has an outside flat face which corresponds to the flat face on the inside surface of the axial end part; and
ribs are provided on at least one of the flat face on the inside surface of the axial end part and the outside flat face of the rotary output shaft and are tapered in an axial direction.

10. A rotary-type door apparatus according to claim 1, wherein:
the rotary-type door is mounted in the air conditioner unit to change air flow directions.

11. A rotary-type door apparatus which includes a driving mechanism, said rotary-type door apparatus comprising:
a rotary-type door; and
a support shaft fixed to the rotary-type door and having a free end part formed with a first engagement portion and a second engagement portion, said free end part being formed in a generally tubular shape, said first engagement portion being formed on an outer peripheral surface of a longitudinal end of said free end part, said second engagement portion being formed on an inner peripheral surface of said longitudinal end of said free end part, said free end part being formed with an outside flat face at only a part of said outer peripheral surface of said tubular shape, wherein:
said driving mechanism is attached to only one of said first engagement portion and said second engagement portion, said driving mechanism including a manually-driven lever having an opening formed into a shape corresponding to said outside flat face of said free end part, said outside flat face of said free end part being fitted into said opening of said manually-driven lever, said outside flat face of said free end part determining a fitting position of said manually-driven lever in a circumferential direction;
said free end part being formed with a recess on said outside flat face; and
said manually-driven lever including an engagement member for engagement with said recess thereby preventing said lever from disengaging from said support shaft in an axial direction of said support shaft.

12. A rotary-type door apparatus of claim 1, wherein:
said free end part is formed with an inside flat face at only a part of said inner peripheral surface of said tubular shape;
said driving mechanism includes an electrically-driven actuator having a rotary output shaft formed to have an outer peripheral surface corresponding to said inner peripheral surface of said free end part;
said rotary output shaft is fitted into said free end part; and
said inside flat face of said free end part determines a fitting position of said rotary output shaft in a circumferential direction.

13. A rotary-type door apparatus of claim 11, wherein:
said rotary-type door apparatus is applied to an air conditioning apparatus for a vehicle and changes air flow directions; and
said driving mechanism is attached directly to said one of said engagement portions in a longitudinal direction of said support shaft.

14. A rotary-type door apparatus comprising:
a rotary-type door;
a tubular support shaft fixed to the rotary-type door, the tubular support shaft having an outer surface and an inner surface;
a first engagement portion formed on the outer surface of the tubular support shaft, the first engagement portion including a flat face and a recess formed on the flat face;
a second engagement portion formed on the inner surface of the tubular support shaft;
a lever formed with an opening which corresponds to a radially outside peripheral shape of the outer surface of the tubular support shaft, the lever being fixedly fitted on the tubular support shaft so that the flat face determines a fitting position of the lever in a circumferential direction, the lever including an engagement member for engagement with the recess to prevent the lever from disengaging from the tubular support shaft in an axial direction.

15. A rotary-type door apparatus comprising:
a rotary-type door;
a tubular support shaft fixed to the rotary-type door, the tubular support shaft having an outer surface and an inner surface;
a first engagement portion formed on the outer surface of the tubular support shaft;
a second engagement portion formed on the inner surface of the tubular support shaft, the second engagement portion including a flat face;
an electrically-driven actuator having a rotary output shaft formed to have an outer surface with a radially outside peripheral shape which corresponds to a radially inside shape of the inner surface of the tubular support shaft, the rotary output shaft being fixedly fitted into the tubular support shaft so that the flat face determines a fitting position of the rotary output shaft in a circumferential direction; and a rib provided on one of the inner surface of the tubular support shaft and the outer surface of the rotary output shaft, the rib being tapered in an axial direction.

16. A rotary-type door apparatus which includes a driving mechanism, said rotary-type apparatus comprising:

a rotary-type door; and a support shaft fixed to the rotary-type door and having a free end part formed with a first engagement portion and a second engagement portion, said free end part being formed in a generally tubular shape, said first engagement portion being formed on an outer peripheral surface of a longitudinal end of said free end part, said second engagement portion being formed on an inner peripheral surface of said longitudinal end of said free end part, wherein:

said driving mechanism is attached to only one of said first engagement portion and said second engagement portion;

said rotary output shaft has an outside flat face which corresponds to said inside flat face of said free end part; and ribs are provided on at least one of said inside flat face of said free end part and said outside flat face of said rotary output shaft and are tapered in an axial direction.

* * * * *

UNITED STATES PATENT AND TRADEMARK OFFICE
CERTIFICATE OF CORRECTION

PATENT NO. : 5,921,527
DATED : July 13, 1999
INVENTOR(S) : Katsumi Ikawa et al

It is certified that error appears in the above-identified patent and that said Letters Patent is hereby corrected as shown below:

Title page, [57] Abstract, line 5, "have" should be --has--

Col. 3, line 58, "switch" should be --switching--

Col. 6, line 13, claim 12, "claim 1" should be --claim 11--

Signed and Sealed this

Eighth Day of February, 2000

Attest:

Q. TODD DICKINSON

Attesting Officer

Commissioner of Patents and Trademarks